(12) United States Patent
Shionozaki

(10) Patent No.: US 11,868,405 B2
(45) Date of Patent: Jan. 9, 2024

(54) INFORMATION PROCESSOR, INFORMATION PROCESSING METHOD, AND RECORDING MEDIUM

(71) Applicant: SONY CORPORATION, Tokyo (JP)

(72) Inventor: Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 156 days.

(21) Appl. No.: 16/962,310

(22) PCT Filed: Nov. 1, 2018

(86) PCT No.: PCT/JP2018/040723
§ 371 (c)(1),
(2) Date: Jul. 15, 2020

(87) PCT Pub. No.: WO2019/146205
PCT Pub. Date: Aug. 1, 2019

(65) Prior Publication Data
US 2020/0356602 A1    Nov. 12, 2020

(30) Foreign Application Priority Data
Jan. 23, 2018  (JP) .................... 2018-008609

(51) Int. Cl.
*G06F 16/9035* (2019.01)
*G06F 16/909* (2019.01)
*G06F 16/901* (2019.01)

(52) U.S. Cl.
CPC ........ *G06F 16/9035* (2019.01); *G06F 16/909* (2019.01); *G06F 16/9024* (2019.01)

(58) Field of Classification Search
CPC . G06F 16/9035; G06F 16/909; G06F 16/9024
See application file for complete search history.

(56) References Cited

U.S. PATENT DOCUMENTS 9,235,263 B2 * 1/2016 Suzuki .................. G06F 3/011
9,508,008 B2 * 11/2016 Jerauld ................. G06V 40/20
9,824,698 B2 * 11/2017 Jerauld ................. G06V 20/20
(Continued)

FOREIGN PATENT DOCUMENTS

CA      2949449 A1    11/2015
CN      107111359 A    8/2017
(Continued)

OTHER PUBLICATIONS

Extended European Search Report of EP Application No. 18902097.7, dated Nov. 10, 2020, 10 pages.
(Continued)

*Primary Examiner* — Robert W Beausoliel, Jr.
*Assistant Examiner* — Susan F Rayyan
(74) *Attorney, Agent, or Firm* — CHIP LAW GROUP

(57) ABSTRACT

There is provided an information processor, an information processing method, and a recording medium to automatically estimate a sense of values of a community. The information processor includes a control unit that performs a control. The control unit acquires sensor data obtained by sensing a member who belongs to a specific community, and automatically estimate a sense of values of the member who belongs to the specific community, on the basis of the acquired sensor data.

8 Claims, 17 Drawing Sheets

(56) References Cited

U.S. PATENT DOCUMENTS

| | | | |
|---|---|---|---|
| 10,776,610 B2* | 9/2020 | Hayden | A61B 5/0077 |
| 10,936,643 B1* | 3/2021 | Alspaugh | G06F 16/9024 |
| 2008/0075395 A1* | 3/2008 | Wallace | G06T 11/60 |
| | | | 707/999.2 |
| 2011/0295655 A1* | 12/2011 | Tsuji | G06Q 10/10 |
| | | | 709/224 |
| 2014/0118225 A1* | 5/2014 | Jerauld | G06V 40/20 |
| | | | 345/8 |
| 2015/0206011 A1 | 7/2015 | Jerauld | |
| 2016/0171514 A1* | 6/2016 | Frank | G06Q 30/02 |
| | | | 705/7.29 |
| 2016/0300252 A1* | 10/2016 | Frank | G06F 21/6245 |
| 2017/0117005 A1 | 4/2017 | Jerauld | |
| 2017/0147775 A1 | 5/2017 | Ohnemus et al. | |
| 2017/0330160 A1* | 11/2017 | Sueyoshi | G06Q 30/02 |
| 2019/0005137 A1* | 1/2019 | Gupta | G06F 9/541 |
| 2019/0019249 A1* | 1/2019 | Bhattacharjee | G06Q 40/025 |
| 2019/0030397 A1* | 1/2019 | Hall | A63B 24/0062 |
| 2019/0251596 A1 | 8/2019 | Hosoda | |
| 2020/0334999 A1* | 10/2020 | Chapela | G09B 5/02 |

FOREIGN PATENT DOCUMENTS

| | | |
|---|---|---|
| EP | 3217349 A1 | 9/2017 |
| JP | 2002-367049 A | 12/2002 |
| JP | 2004-326360 A | 11/2004 |
| JP | 2007188314 A | 7/2007 |
| JP | 2007-213324 A | 8/2007 |
| JP | 2014-164629 A | 9/2014 |
| JP | 2015-184887 A | 10/2015 |
| JP | 2016031569 A | 3/2016 |
| JP | 2017-182483 A | 10/2017 |
| WO | 2014/071062 A1 | 5/2014 |
| WO | WO-2014097589 A1 | 6/2014 |
| WO | 2015/179868 A2 | 11/2015 |
| WO | 2016/072117 A1 | 5/2016 |
| WO | 2017/0170454 A1 | 10/2017 |
| WO | 2018/008394 A1 | 1/2018 |

OTHER PUBLICATIONS

International Search Report and Written Opinion of PCT Application No. PCT/JP2018/040723, dated Jan. 29, 2019, 11 pages of ISRWO.

* cited by examiner

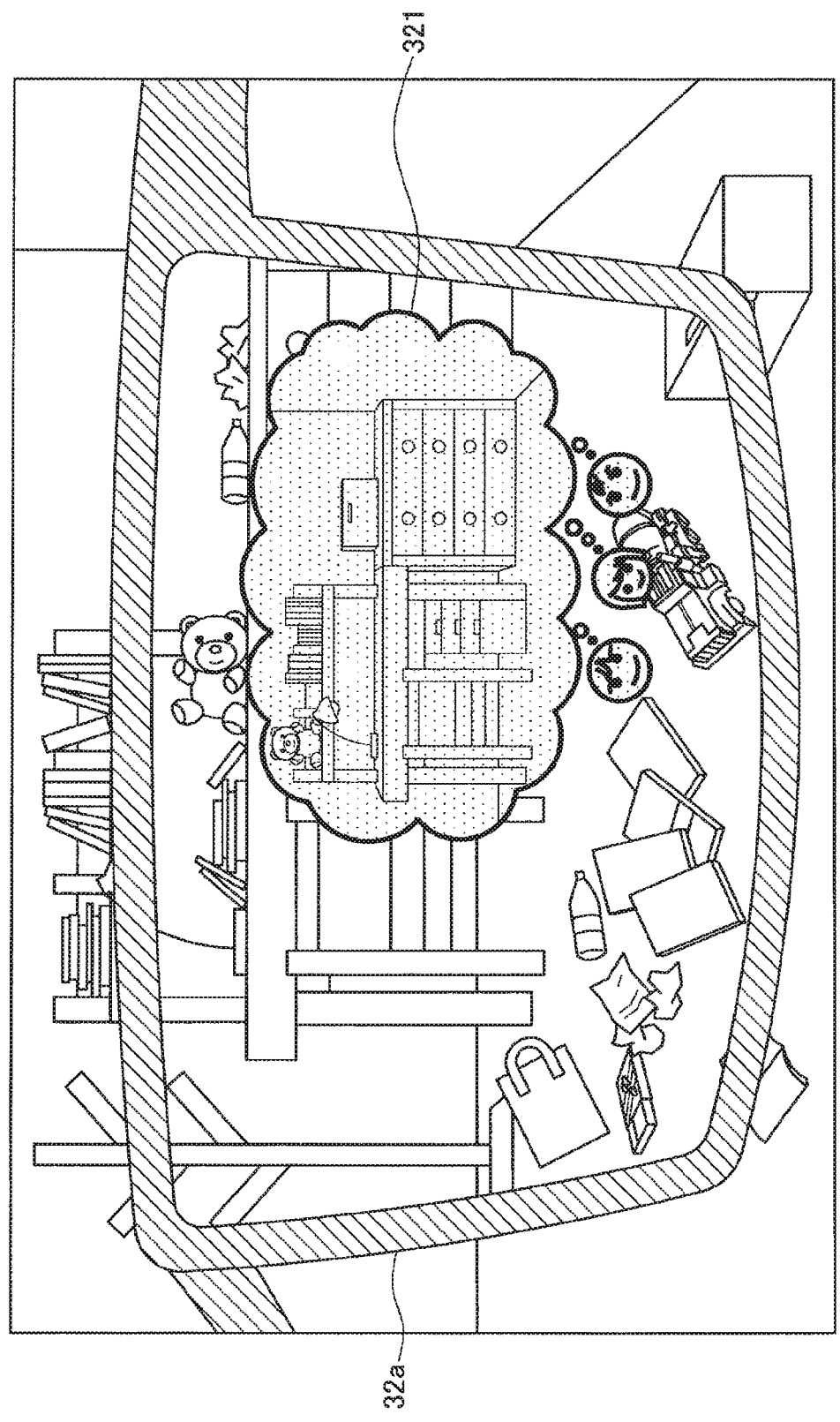

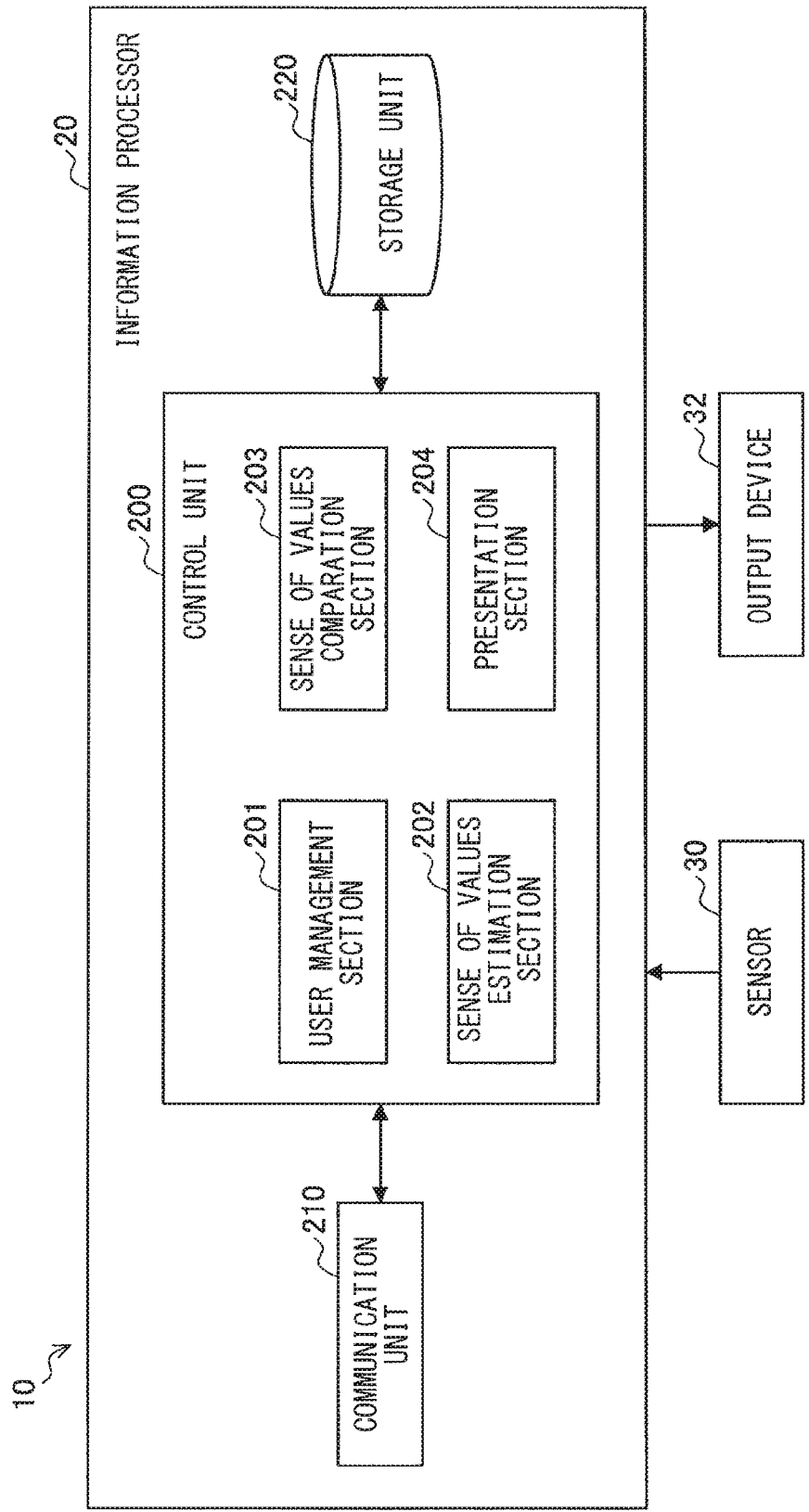
[FIG. 2]

[FIG. 3]
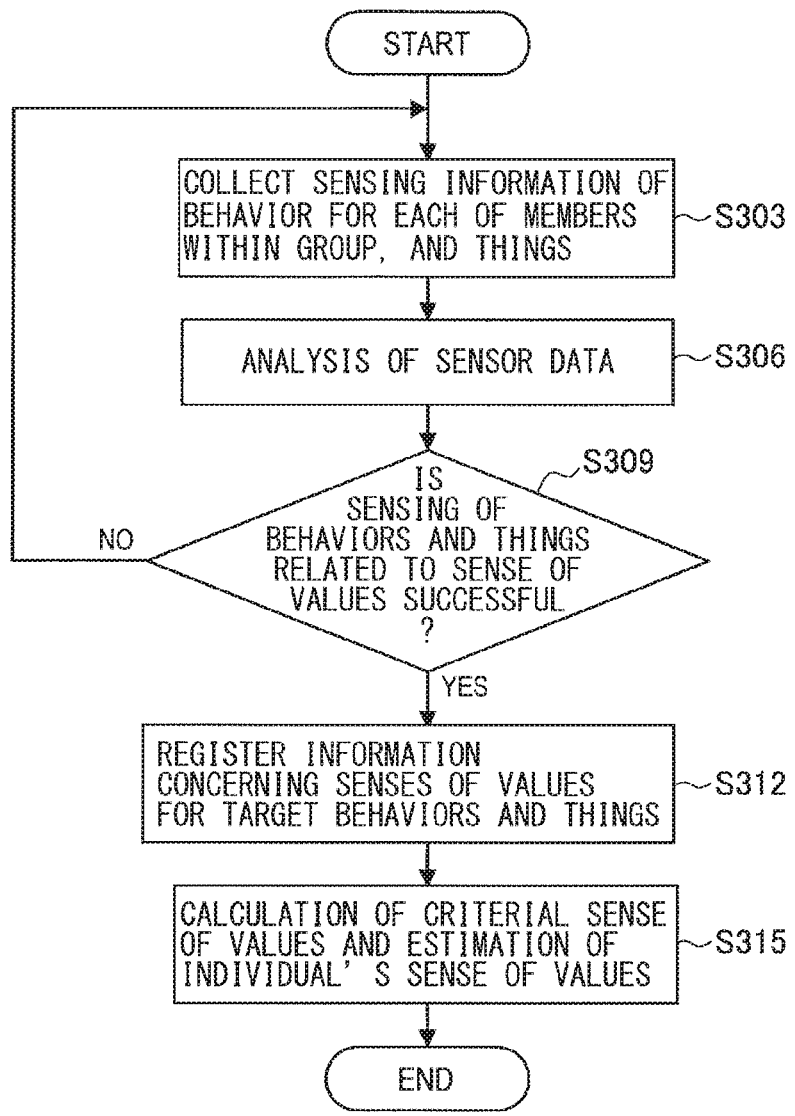

[FIG. 4]
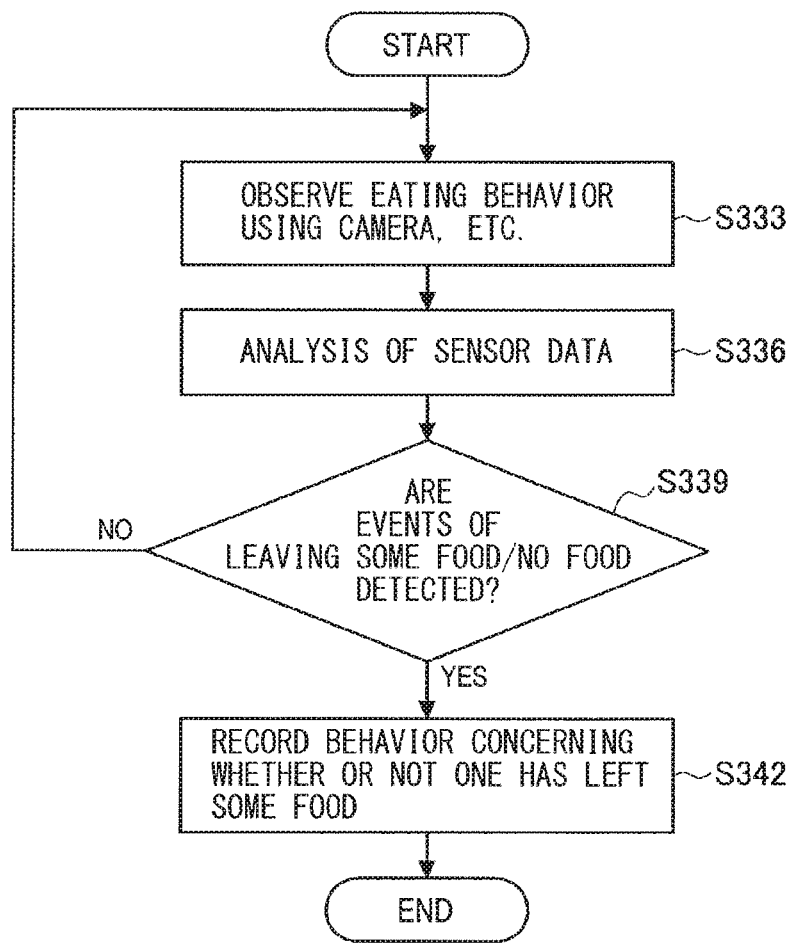

[FIG. 5]
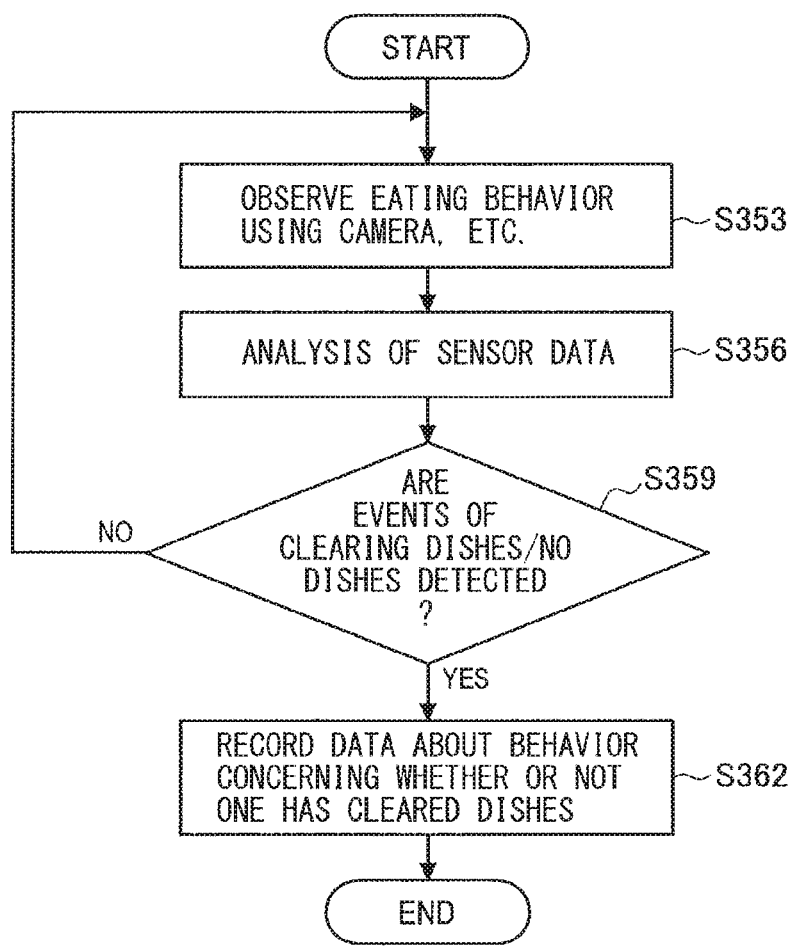

[FIG. 6]
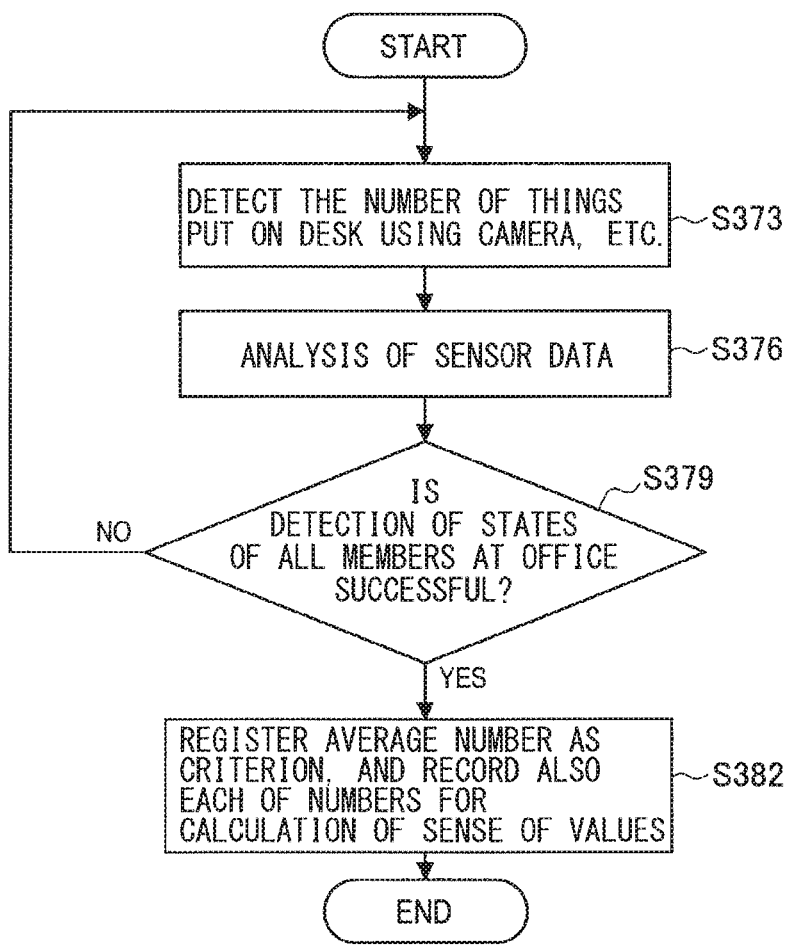

[FIG. 7]
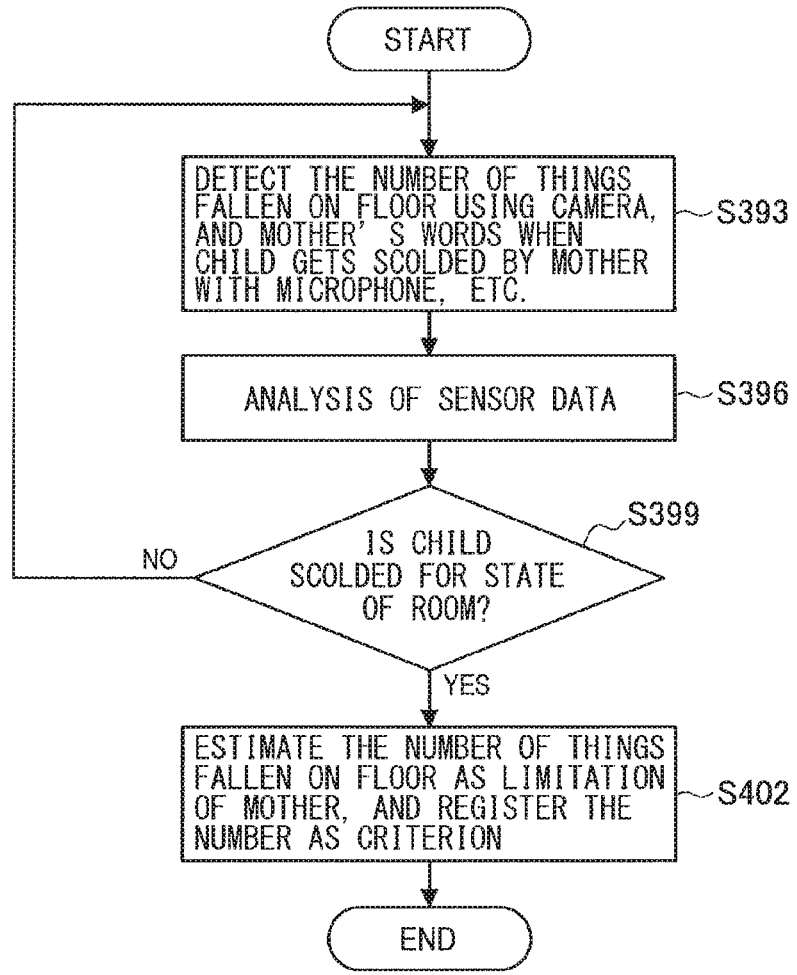

[FIG. 8]
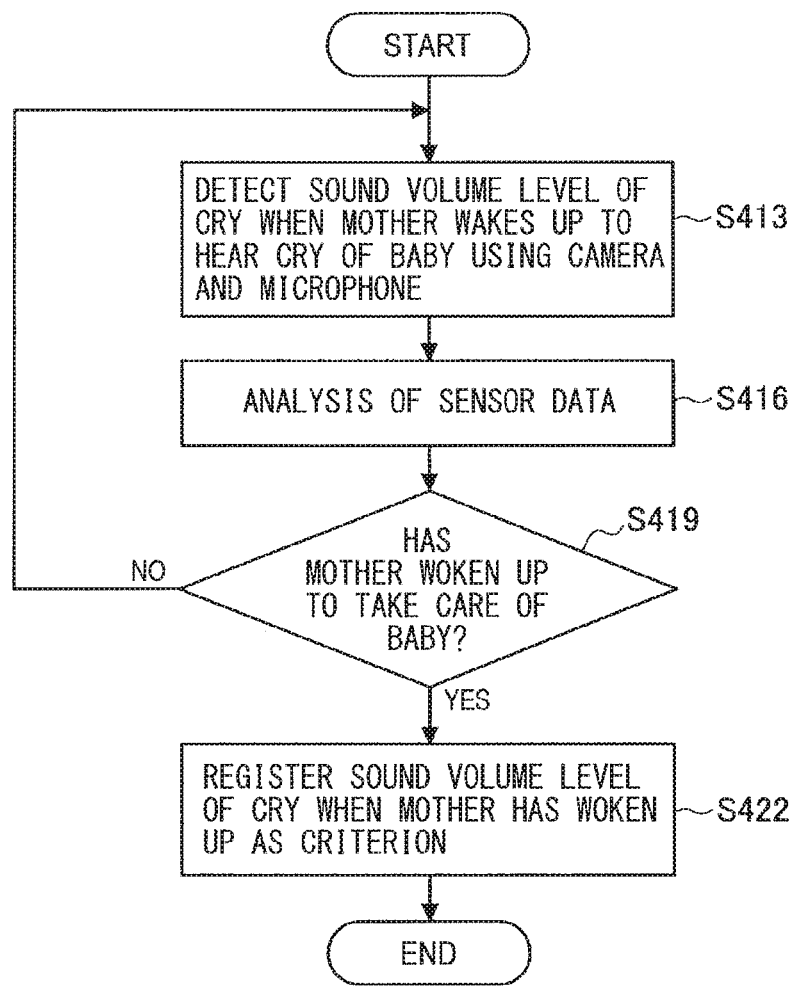

[FIG. 9]
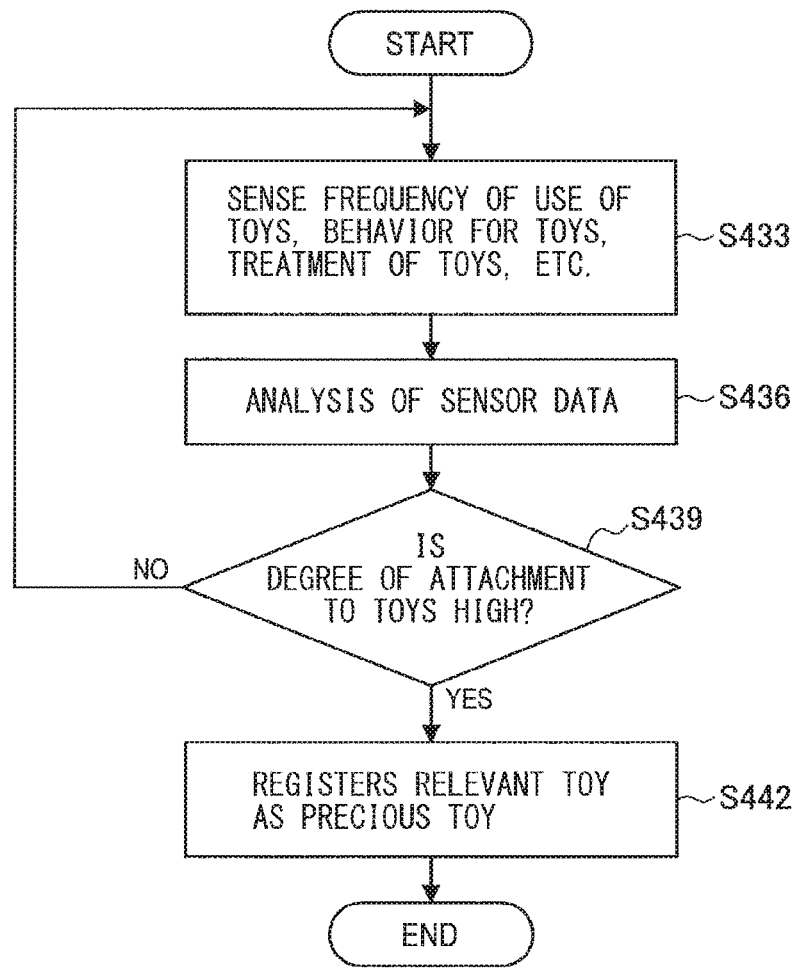

[ FIG. 10 ]
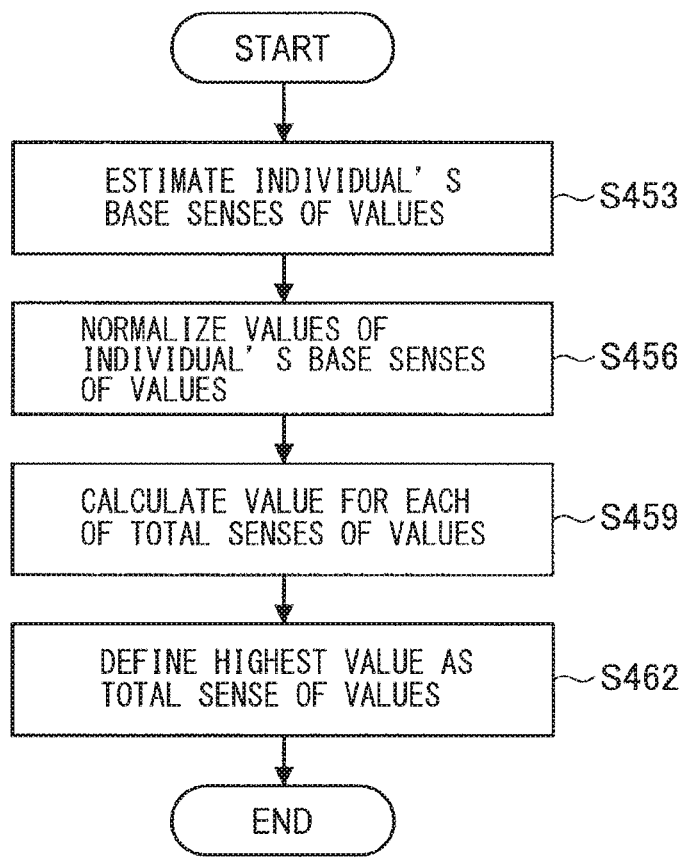

[FIG. 11]

| BASE SENSES OF VALUES | NORMALIZED VALUE OF SENSE OF VALUES | CANDIDATES OF TOTAL SENSE OF VALUES ||||
|---|---|---|---|---|---|
| | | HONESTY | COMPASSION | SOCIETY | INDIVIDUALITY |
| VALUING OF FOOD | 1 | 0.2 | 0.1 | | |
| ALL FAMILY MEMERS' HELPING WITH HOUSE-WORK | 1 | 0.1 | 0.2 | 0.4 | |
| TIDINESS (IN CASE OF CHILD'S ROOM) | 0.3 | 0.03 | 0.06 | 0.09 | |
| CHILD-CARE | 0 | 0 | 0 | 0 | |
| LOVE OF THINGS | 0.9 | | 0.18 | | 0.27 |
| | | 0.33 | 0.54 | 0.49 | 0.27 |

[ FIG. 12 ]
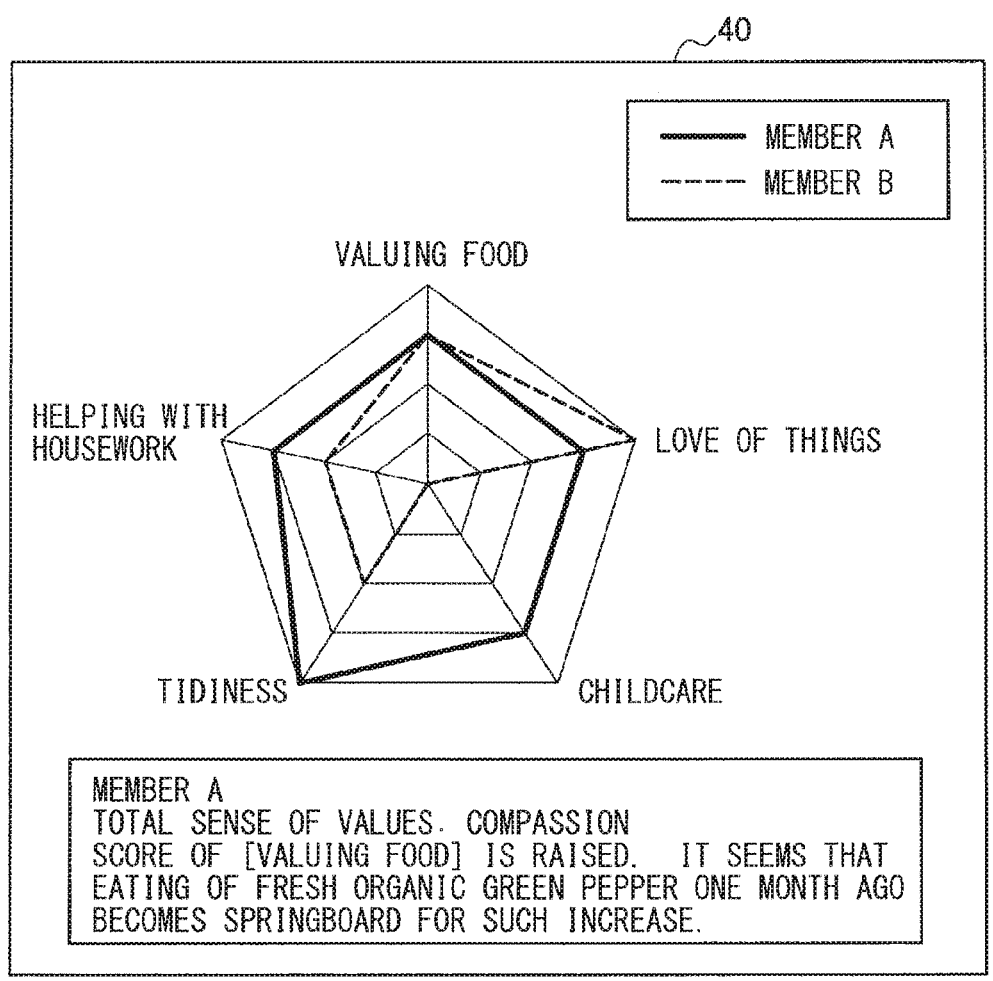

[FIG. 13]
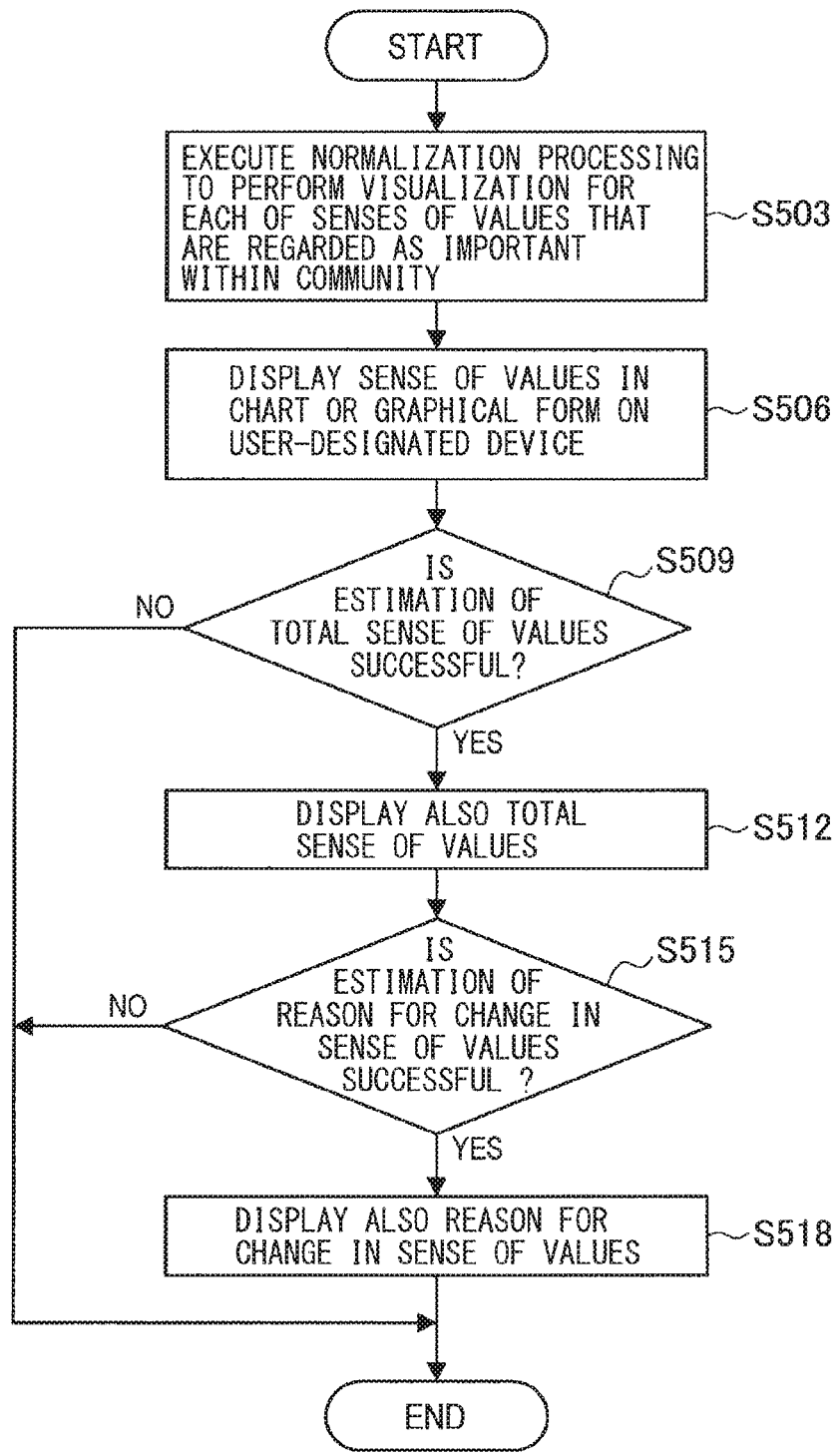

[FIG. 14]
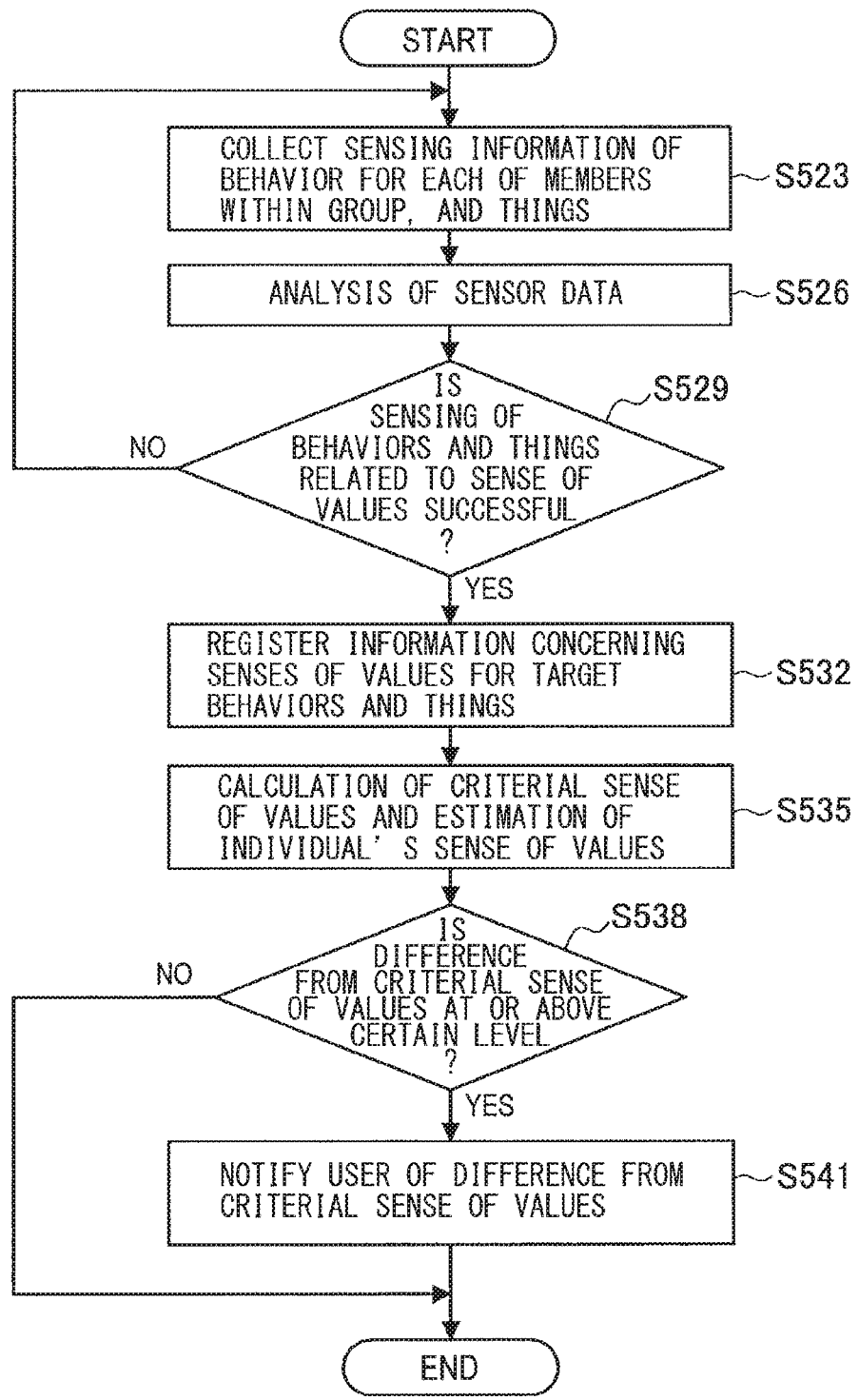

[FIG. 15]
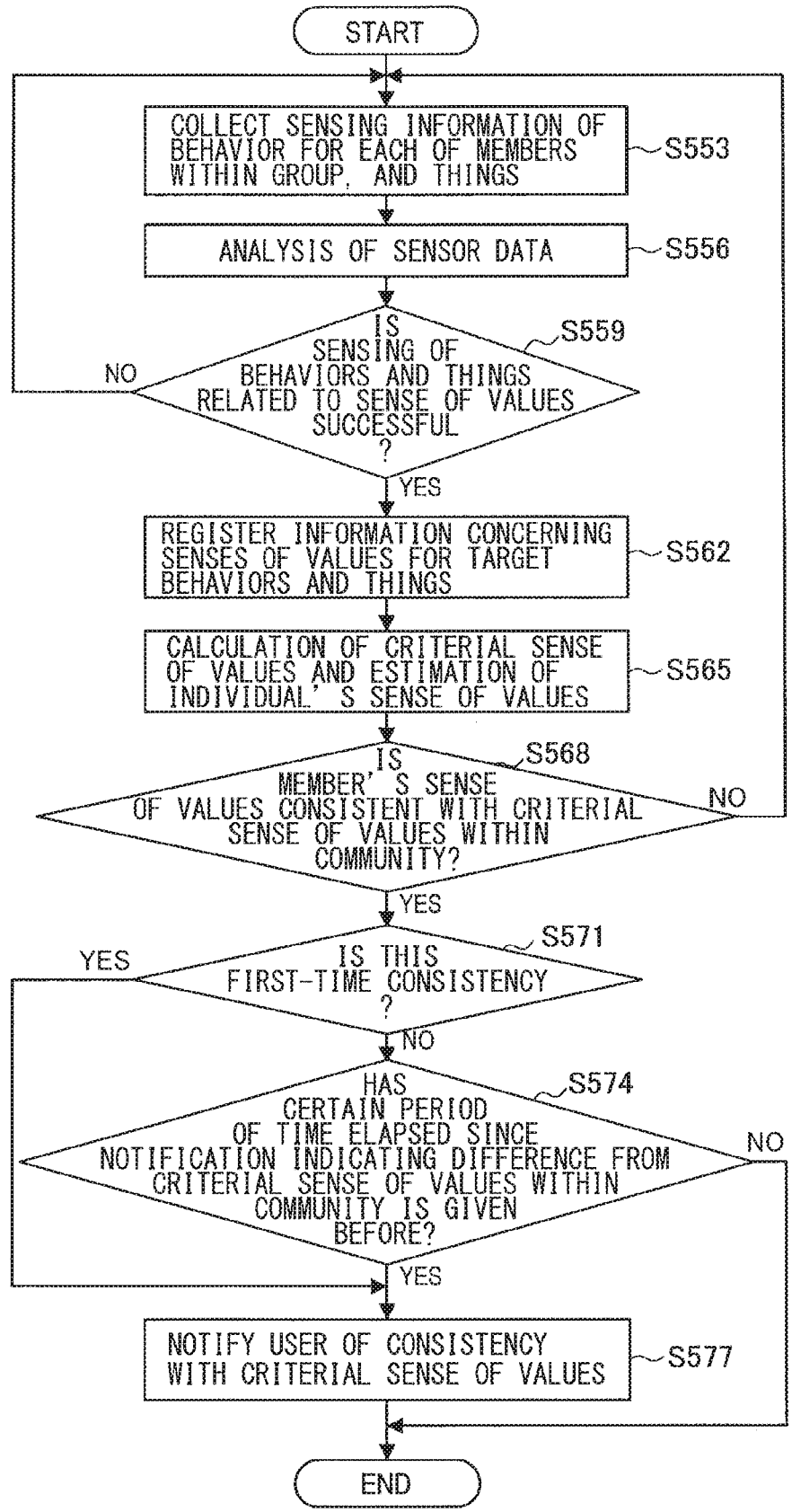

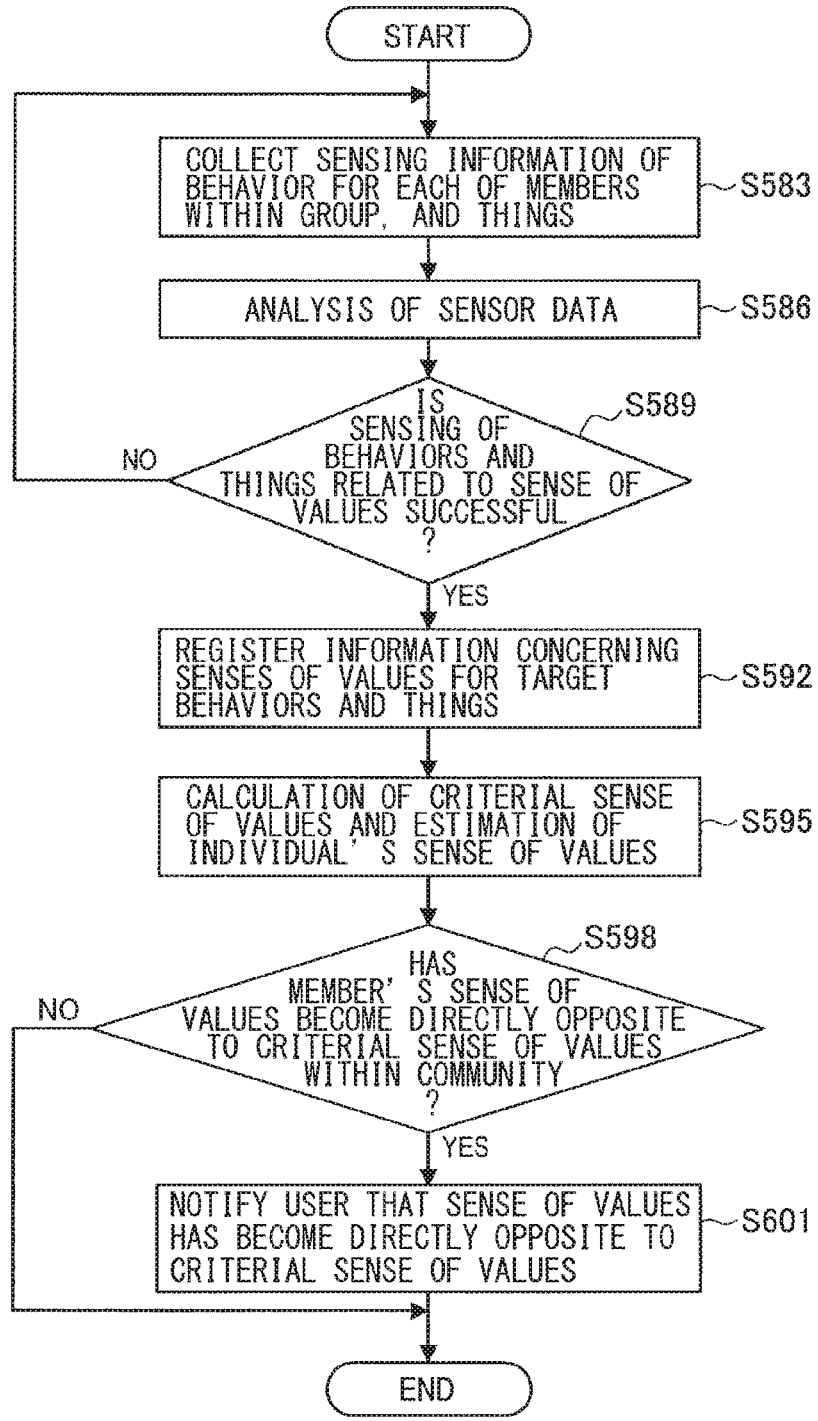
[FIG. 16]

[ FIG. 17 ]
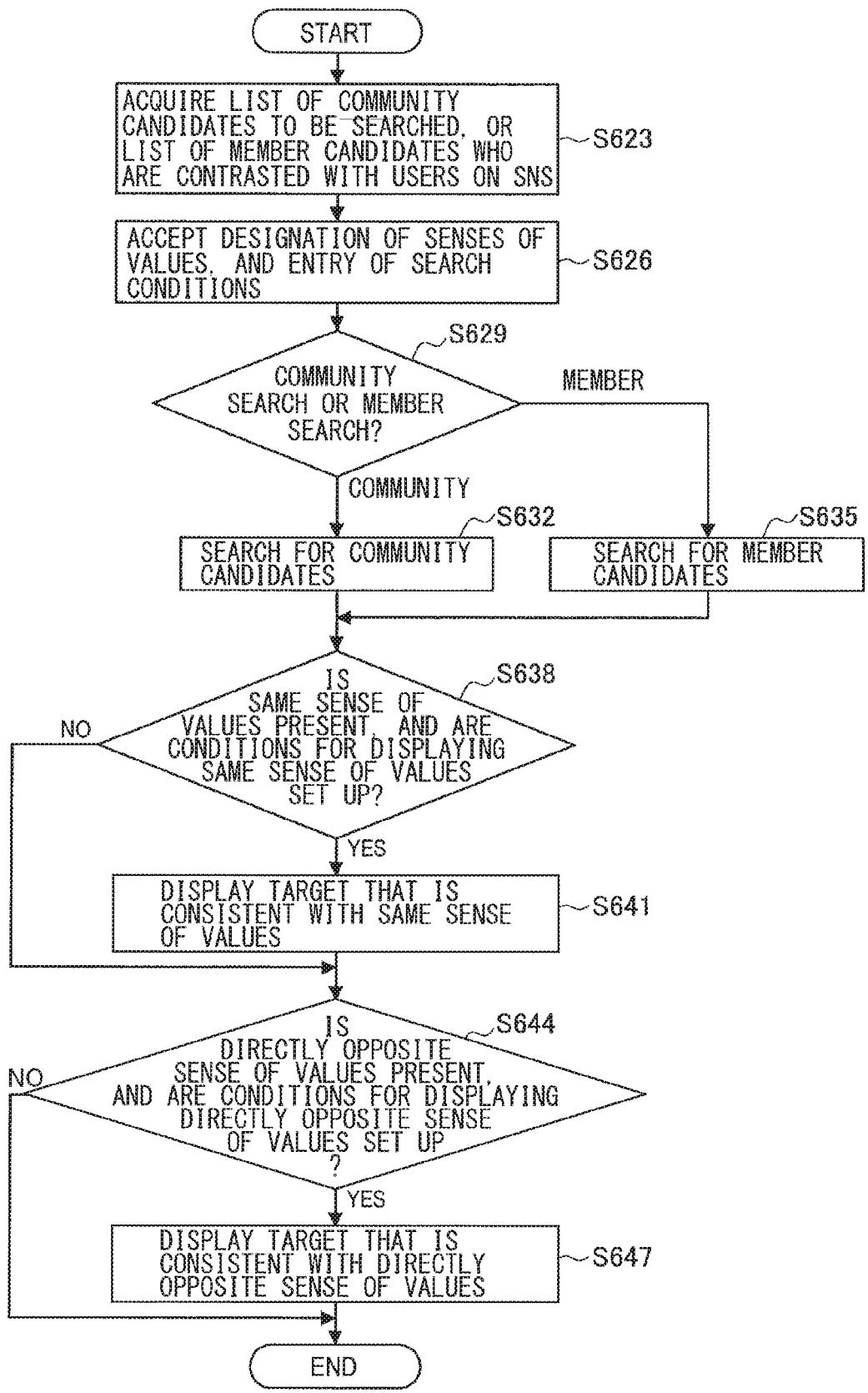

INFORMATION PROCESSOR, INFORMATION PROCESSING METHOD, AND RECORDING MEDIUM

CROSS REFERENCE TO RELATED APPLICATIONS

This application is a U.S. National Phase of International Patent Application No. PCT/JP2018/040723 filed on Nov. 1, 2018, which claims priority benefit of Japanese Patent Application No. JP 2018-008609 filed in the Japan Patent Office on Jan. 23, 2018. Each of the above-referenced applications is hereby incorporated herein by reference in its entirety.

TECHNICAL FIELD

The present disclosure relates to an information processor, an information processing method, and a recording medium.

BACKGROUND ART

A so-called "sense of values" that represents the ways one has a notion about or a view on things, what one values, cares for, and regards as important, or the like varies among individuals. However, to date, a clear criterion representing such a "sense of values" has not been defined, which has brought difficulty with understanding a sense of values of anyone else.

Further, in the course of life within a specific community, such as a family and small-sized groups (a company, a school, a neighborhood association, or the like), one's own sense of values has naturally come to match a sense of values of any other members, or, on the contrary, some sort of issue has arisen in a case where the one's own sense of values does not match a sense of values within the community.

CITATION LIST

Patent Literature

PTL 1: Japanese Unexamined Patent Application Publication No. 2014-164629
PTL 2: Japanese Unexamined Patent Application Publication No. 2004-326360
PTL 3: Japanese Unexamined Patent Application Publication No. 2002-367049

SUMMARY OF THE INVENTION

Problems to be Solved by the Invention

Here, in a case where decluttering such as, for example, tidiness of a room is considered as an example of a sense of values, for example, PTL 1 cited above, which does not deal with the "sense of values", discloses a system that determines and outputs a decluttering degree of an object to be determined within a captured image.

Further, PTL 2 cited above discloses a system that starts to capture an image when a sensor detects any defect, and transmits the captured image to another apparatus, or outputs such an image on a display unit. In addition, PTL 3 cited above discloses a system that gives notice to a guardian with a speaker in a case where sound of a cry that a baby lets out reaches a predetermined value or more.

However, the above-described prior art references perform only display, notice, or the like on the basis of predefined conditions, and do not deal with any sense of values (conditions and events) of each individual, making no mention to the ways such conditions are developed.

Further, in many cases, it is within a specific community, such as a family and small-sized groups (a company, a school, a neighborhood association, or the like) that a difference in a sense of values, or the like presents an issue. As a result, rather than analyzing big data collected from a whole society of recent years, it becomes important to analyze a sense of values of an individual or a community by paying attention to a small group of community such as a family to collect relevant data.

Therefore, the present disclosure proposes an information processor, an information processing method, and a recording medium that allow for automatic estimation of a sense of values of a specific community.

Means for Solving the Problems

According to the present disclosure, there is proposed an information processor that includes a control unit that performs a control. The control unit is configured to acquire sensor data obtained by sensing a member who belongs to a specific community, and automatically estimate a sense of values of the member who belongs to the specific community, on the basis of the acquired sensor data.

According to the present disclosure, there is proposed an information processing method that includes: acquiring, with a processor, sensor data obtained by sensing a member who belongs to a specific community; and automatically estimating, with the processor, a sense of values of the member who belongs to the specific community, on the basis of the acquired sensor data.

According to the present disclosure, there is proposed a recording medium containing a program recorded therein that causes a computer to function as a control unit that performs a control. The control includes: acquiring sensor data obtained by sensing a member who belongs to a specific community; and automatically estimating a sense of values of the member who belongs to the specific community, on the basis of the acquired sensor data.

Effects of the Invention

As described above, according to the present disclosure, it is possible to automatically estimate a sense of values of a specific community.

It is to be noted that the effects described above are not necessarily limitative, and any of effects described in the present specification, or any other effects that are comprehensible from the present specification may be provided along with the above-described effects or in lieu of the above-described effects.

BRIEF DESCRIPTION OF DRAWINGS

FIG. 1 is a diagram describing an overview of an information processing system according to an embodiment of the present disclosure.

FIG. 2 is a block diagram illustrating an example of a configuration of a system according to the present embodiment.

FIG. 3 is a basic flowchart of automatic estimation processing of a sense of values according to a first example.

FIG. 4 is a flowchart illustrating record processing of a sense of values concerning discipline of eating manners according to the first example.

FIG. 5 is a flowchart illustrating the record processing of a sense of values concerning clearing of dishes according to the first example.

FIG. 6 is a flowchart illustrating the record processing of a sense of values concerning straightening of a desk at an office according to the first example.

FIG. 7 is a flowchart illustrating the record processing of a sense of values concerning clearing of a room according to the first example.

FIG. 8 is a flowchart illustrating the record processing of a sense of values concerning a cry of a baby according to the first example.

FIG. 9 is a flowchart illustrating the record processing of a sense of values concerning toys according to the first example.

FIG. 10 is a flowchart illustrating calculation processing of a total sense of values according to the first example.

FIG. 11 is a table illustrating an example of values for each of total senses of values of an individual member according to the first example.

FIG. 12 is a diagram of an example of a radar chart illustrating total senses of values of members according to a second example.

FIG. 13 is a flowchart illustrating an example of visualization processing of senses of values according to the second example.

FIG. 14 is a flowchart illustrating notification processing when a relationship is developed that a difference from a criterial sense of values within a specific community according to a third example is at or above a certain level.

FIG. 15 is a flowchart illustrating the notification processing when a member's sense of values is consistent with a criterial sense of values within a specific community according to the third example.

FIG. 16 is a flowchart illustrating the notification processing when a member's sense of values has become directly opposite to a criterial sense of values within a specific community according to the third example.

FIG. 17 is a flowchart illustrating search processing of communities/members using senses of values according to a fourth example.

MODES FOR CARRYING OUT THE INVENTION

Hereinafter, preferred embodiments of the present disclosure will be described in detail with reference to the attached drawings. It is to be noted that, in the present specification and drawings, component parts having substantially the same functional configurations are denoted with the same reference numerals, and the duplicated descriptions are omitted.

Further, descriptions are given in the following order.
1. Overview of Information Processing System According to Embodiment of Present Disclosure
2. Configuration Example
3. Respective Examples
  3-1. First Example
  3-2. Second Example
  3-3. Third Example
  3-4. Fourth Example
4. Conclusion 1. Overview of Information Processing System According to Embodiment of Present Disclosure FIG. 1 is a diagram describing an overview of an information processing system according to an embodiment of the present disclosure. The present disclosure pays attention to a specific community, such as a family or small-sized groups (a company, a school, a neighborhood association, or the like), and achieves automatic estimation of a sense of values on the basis of data collected from a member belonging to the specific community. In the present specification, a "sense of values" represents the ways one has a notion about or a view on things, what one values, cares for, and regards as important, or the like. The information processing system makes it possible to automatically generate a criterial sense of values within the specific community (for example, an average value of members' senses of values, or a specific member's sense of values), and to give notice of the criterial sense of values to any member having a sense of values deviating from the criterial sense of values.

For example, in regard to a sense of values concerning clearing or decluttering of a room, in some cases, even if a user determines that a room is not cluttered enough to be pointed out at its own judgment, a criterion for determining a decluttering state or a cluttered state on the basis of a sense of values of other family members such as parents or an elder sister is different from such a criterion of the user. Therefore, a decluttering state of a room is detected (for example, detection of the number of things falling down on a floor; cluttered states of things put on a floor, a table, or a desk; and trash) using, for example, a camera or the like that is mounted in the room, and a sense of values of each family member for the decluttering is estimated automatically. Subsequently, in a case where a room of a certain family member deviates from the family's sense of values for the decluttering, the family's criterial sense of values for the decluttering is presented as illustrated in FIG. 1.

In an example illustrated in FIG. 1, a notification image 321 is displayed on a transmissive display section of an AR (Augmented Reality) eyeglasses terminal 32a to be worn by a user. A method of notification is not limited to the example illustrated in FIG. 1, but, for example, notification may be given to a smartphone, a mobile phone terminal, a tablet terminal, or the like that is owned by a user; a notification image may be projected in a room using a projector; or the notification image may be displayed on a display mounted on a wall or a table. As an alternative, voice-based notification may be given through the use of a speaker.

The notification image 321 illustrated in FIG. 1 is displayed when a user comes in a room, for example. The family's criterial sense of values for the decluttering may be presented utilizing a captured image of the user's room. In other words, an image representing a decluttering state that should be maintained on the basis of the family's sense of values is generated from the captured image of the user's room (or using the captured image of the room that is formerly kept tidy and ordered) to be presented. This allows the user to check a state of the room the user is seeing against the presented state of the room that reflects the family's sense of values, and to intuitively perceive that the family's sense of values and the user's own sense of values are mismatched.

2. Configuration Example

FIG. 2 is a block diagram illustrating an example of a configuration of a system 10 according to the present embodiment. As illustrated in FIG. 2, the system 10 according to the present embodiment includes an information processor 20, a sensor 30 (or a sensor system), and an output device 32 (or an output system).

(Sensor 30)

The sensor 30 is an apparatus/system that acquires all information related to a member (user) who belongs to a specific community. For example, the sensor 30 may include a sensor on side of an environment, a motion sensor, and various types of sensors on side of the user. The sensor on the side of environment is a camera, a microphone, or the like, provided in a room. The motion sensor is an acceleration sensor, a gyro sensor, a geomagnetic sensor, etc. provided on the smartphone or a wearable device possessed by the user. The various types of sensors on the side of the user are a biological sensor, a position sensor, a camera, and a microphone, or the like. In addition, activity history of the user may be acquired over a network. The activity history is movement history, SNS, shopping history, or the like. The sensor 30 senses activities of members in a specific community on a daily basis and the information processor 20 collects sensed data.

(Output Device 32)

The output device 32 is an expression device that notifies the members of the sense of values automatically estimated by the information processor 20. The output device 32 may broadly include IoT devices such as the smartphone, the tablet terminal, a portable phone terminal, a PC, a wearable device (HMD, smart eyeglass, the smart band, or the like), a TV set, lighting equipment, a speaker, or a vibration device.

(Information Processor 20)

The information processor 20 includes a communication unit 210, a control unit 200, and a storage unit 220. The information processor 20 may include a cloud server on a network, may include an intermediate server or an edge server, may include the dedicated terminal placed in home, such as the home agent, or may include an information processing terminal such as the PC or the smartphone.

Control Unit 200

The control unit 200 functions as an arithmetic processing apparatus and a controller, and controls overall actions in the information processor 20 in accordance with various types of programs. The control unit 200 is implemented by an electronic circuit such as a CPU (Central Processing Unit) or a microprocessor, for example. In addition, the control unit 200 may include a ROM (Read Only Memory) and a RAM (Random Access Memory). The ROM stores a program or an operation parameter to be used, or the like. The RAM temporarily stores a parameter, or the like, that varies as appropriate.

Further, the control unit 200 according to the present embodiment functions also as a user management section 201, a sense of values estimation section 202, a sense of values comparison section 203, and a presentation section 204.

The user management section 201 manages information for identifying a user, and senses of values of each user for target behaviors and things to store such information in the storage unit 220 as appropriate. Various indexes are envisaged for the sense of values, and an example of the senses of values to be used in the present embodiment is given in Table 1 below. It is to be noted that, in the present embodiment, behaviors (necessary information) to be sensed for estimating each sense of values may be predefined as follows.

TABLE 1

| Senses of values | Behaviors to be sensed | Criterial sense of values | Record information |
|---|---|---|---|
| Eating manners | Eating behavior is observed with a camera, etc. | No food is to be left. | Date and time, leaving some food/no food |
| Help with housework | Eating behavior is observed with a camera, etc. | Dishes are to be cleared. | Date and time, clearing dishes/no dishes |
| Tidiness (desk at office) | The number of things put on a desk is detected with a camera, etc. | An average number of a group is defined as a criterion. | An average number of a group, such as date and time, the number of things put on a desk |
| Tidiness (child's room) | The number of things cluttering on a floor is detected with a camera, etc., and mother's angry voice is detected with a microphone, etc. | The number of things cluttering on a floor when mother got angry (limitation of mother is defined as a criterion) | The number of things cluttering on a floor when mother got angry |
| Childcare | Sound volume level of a cry of a baby at the time mother wakes up by a cry is detected with a camera and a microphone. | Sound volume level of a cry at the time mother wakes up by a cry | Sound volume level of a cry at the time mother wakes up by a cry |
| Things | A frequency of use and treatment of toys are measured by utilizing camera images or approach of radio waves such as BLE/RFID. Conversation concerning preciousness of toys is detected with a microphone. | Child's degree of attachment and loving to toys | Toys with high degree of loving from a child are registered. |
| Total sense of values | Behaviors of base senses of values | An average of a group, etc. | Base senses of values |

The sense of values estimation section 202 performs automatic estimation (generation) of a criterion of values (hereinafter also referred to as a criterial sense of values) that is defined within a group (a specific community) of target behaviors and things, and stores such criterial information in the storage unit 220. Further, the sense of values estimation section 202 estimates and manages also an individual sense of values of a user. A group's criterial sense of values may be, for example, an average value of senses of values of each user within a group (calculation may be weighted on each member basis), or a sense of values of a specific user (for example, a parent or any other individual) may be used as the group's criterial sense of values. It may be predefined, for example, as represented in Table 2 given below whether each of senses of values is estimated on the basis of what kind of information. In other words, the sense of values estimation section 202 analyzes specific sensor data to estimate a specified sense of values, and performs automatic estimation of the above-described predefined sense of values in accordance with an analysis result.

TABLE 2

| Senses of values | Estimation of senses of values |
|---|---|
| Eating manners | The number of events of leaving some food/leaving no food |
| Help with housework | The number of events of clearing dishes/no dishes |
| Tidiness (desk at office) | The number of things put on a desk |
| Tidiness (child's room) | The number of things cluttering (fallen) on a floor when mother got angry |
| Childcare | Sound level of a cry of a baby when mother has woken up |
| Things | Child's degree of attachment and loving to toys |
| Total sense of values | Estimation from values obtained by normalizing base senses of values |

The sense of values comparation section 203 detects inconsistency or consistency of a sense of values of each user with a criterial sense of values for behaviors and things to be sensed on a daily basis. The criterial sense of values within a group may be automatically generated by the sense of values estimation section 202 as described above, or may be preset (may be defaulted on a system side, or may be set manually by a user of the group).

The presentation section 204 notifies a specific member of a group's sense of values, inconsistency or consistency of a sense of values, and the like. Specifically, for example, the presentation section 204 generates images representing the group's sense of values, the inconsistency or consistency of a sense of values, and the like to transmit such images from the communication unit 210 to the output device 32.

(Communication Unit 210)

The communication unit 210 couples to an external apparatus such as the sensor 30 or the output device 32, by wire or wirelessly, to perform transmission and reception of data. The communication unit 210 communicatively couples to the external device, for example, via a wired/wireless LAN (Local Area Network) or Wi-Fi (Registered trademark), Bluetooth (Registered trademark), a mobile communication network (LTE (Long Term Evolution) and 3G (Third-generation mobile telecommunications)), or the like.

(Storage Unit 220)

The storage unit 220 is implemented by the ROM (Read Only Memory) and the RAM (Random Access Memory). The ROM stores the program or the operation parameter to be used in the processing of the control unit 200, or the like. The RAM temporarily stores the parameter that varies as appropriate.

As above, specific description has been given of the configuration of the system 10 according to the present embodiment. It is to be noted that the configuration of the system 10 is not limited to the example illustrated in FIG. 2. For example, the information processor 20 may include a plurality of apparatuses, or may be integrated with the sensor 30 or the output device 32.

2. Respective Examples

Subsequently, the information processing system for automatic estimation of a sense of values according to the present embodiment is described concretely using a plurality of examples.

2-1. First Example

Initially, automatic estimation processing of a sense of values within a specific community is described using a flowchart.

(2-1-1. Basic Flow)

FIG. 3 is a basic flowchart of action processing according to the present example. As illustrated in FIG. 3, at first, the information processor 20 collects sensing information on behavior for each of members within a group, and things (Step S303), and performs analysis of sensor data (Step S306).

Next, in a case where sensing of behaviors and things related to senses of values are successful (Step S309/Yes), the information processor 20 registers information concerning senses of values for target behaviors and things (Step S312).

Subsequently, the information processor 20 performs calculation of a criterial sense of values (of a group), and estimation of a sense of values of an individual (an individual sense of values) (Step S315). For calculation of the criterial sense of values, for example, an average value of a sense of values of each member within the group may be calculated, or a sense of values of someone among the members may be used as the criterial sense of values. For example, for a sense of values of "valuing of food", the information processor 20 records information concerning whether or not one has left some food, and estimates a sense of values of each member in accordance with a predefined rule.

As above, description has been given of the basic flow of estimation processing of a sense of values. Next, record processing of respective senses of values is described using specific examples of the senses of values.

(2-1-2. Sense of Values for Eating Manners)

An example of a sense of values includes the sense of values concerning "eating manners". Specifically, "discipline of eating manners" such as valuing the food, or leaving no food is envisaged. In the present example, it is possible to sense behavior at mealtime within a specific community, and to automatically estimate a sense of values of each member concerning "eating manners".

FIG. 4 is a flowchart illustrating record processing of a sense of values concerning discipline of eating manners according to the present example. As illustrated in FIG. 4, at first, the information processor 20 observes behavior of each family member at mealtime using a camera or the like (Step S333), and performs analysis of sensor data (Step S336).

Next, in a case where an event of leaving some food/leaving no food is detected (Step S339/Yes), the information processor 20 records behavior concerning whether or not a member has left some food along with date and time as information concerning individual's "discipline of eating manners" (Step S342). In such a manner, recording the number of events of leaving some food/leaving no food makes it possible to estimate the sense of values concerning "eating".

(2-1-3. Sense of Values for Housework)

Further, as a sense of values concerning housework, for example, it is envisaged that "all family members clear dishes after meal". In the present example, it is possible to sense behavior after meal within a specific community, and to automatically estimate a sense of values of each member concerning "helping with housework".

FIG. 5 is a flowchart illustrating the record processing of a sense of values concerning clearing of dishes according to the present example. As illustrated in FIG. 5, at first, the information processor 20 observes behavior at mealtime using a camera or the like (Step S353), and performs analysis of sensor data (Step S356).

Next, in a case where an event of clearing/not clearing dishes after meal is detected (Step S359/Yes), the information processor 20 records behavior data concerning whether or not each member has cleared dishes (Step S362). In such a manner, recording the number of events of clearing/not clearing dishes makes it possible to estimate the sense of values concerning "helping with housework".

(2-1-4. Tidiness of Room)

Further, as a sense of values concerning tidiness of a room, such as an office or one's room, a decluttering state (a clearing degree) including, for example, a condition in which things are not cluttered on a floor or a desk is envisaged.

FIG. 6 is a flowchart illustrating the record processing of a sense of values concerning straightening of a desk at an office. As illustrated in FIG. 6, for example, the information processor 20 detects (images) the number of things put on a desk at an office using a camera or the like (Step S373), and performs analysis of sensor data (calculation of the number of things through the use of image analysis, or the like) (Step S376). Here, as an example, "the number of things" is to be detected; however, a straightening state may be detected through the use of the image analysis.

Next, in a case where detection of states of all members within the office is successful (Step S379), the information processor 20 registers an average number of a group as a criterion (a criterial sense of values), and records also the number of things put on a desk of each member to calculate an individual's sense of values (Step S382).

In such a manner, recording the number of things put on a desk at an office makes it possible to estimate the sense of values concerning "tidiness of the office".

Further, also for tidiness of a room, recording is performed in a similar manner. FIG. 7 is a flowchart illustrating the record processing of a sense of values concerning clearing of a room. As illustrated in FIG. 7, at first, the information processor 20 detects the number of things cluttering (fallen) on a room floor using a camera or the like, and voice emanating from mother when a child gets scolded by mother using a microphone or the like (Step S393), and performs analysis of sensor data (Step S396).

Next, in a case where a child got scolded by mother for a state of a room (Step S399/Yes), the information processor 20 regards the number of things fallen on a floor as a limitation of mother, and registers such a limitation as a group's criterial sense of values (Step S402). In the present example, for the tidiness of a room, the limitation of mother is defined as the group's criterion of values. As an alternative, the number of things fallen on a room floor may be recorded as an individual's sense of values concerning the "tidiness of a room".

It is to be noted that the tidiness of a room is not limited to the number of fallen things, but may be calculated on the basis of, for example, a ratio of the area of a floor on which things are not put, a position of things, a decluttering state, or the like.

(2-1-5. Sense of Values for Childcare)

Further, as a sense of values concerning childcare, it is generally found that, for example, mother becomes aware of a night cry of a baby instantly to wake up, but father is slow to respond. Therefore, it is considered to define a mother's acceptable level (a sound volume of crying that causes mother to be obliged to wake up for cradling a baby) for a cry of a baby as a group's criterial sense of values.

FIG. 8 is a flowchart illustrating the record processing of a sense of values concerning a cry of a baby. As illustrated in FIG. 8, for example, the information processor 20 detects a sound volume level of crying at the time mother becomes aware of a cry of a baby to wake up, using a camera, a microphone, or the like (Step S413), and performs analysis of sensor data (Step S416).

Next, in a case where mother wakes up to take care of a baby (Step S419/Yes), the information processor 20 registers the sound volume level of crying at the time mother has woken up as a criterion (a mother's acceptable level, which is defined as a group's criterial sense of values) (Step S422).

(2-1-6. Sense of Values for Things)

Further, as a sense of values concerning love of things, there are some cases where, for example, a specific stuffed toy is incredibly precious for a child. In the present example, it is possible to sense behavior when a child is playing with toys such as a stuffed toy, and to estimate a child's sense of values for toys.

FIG. 9 is a flowchart illustrating the record processing of a sense of values concerning toys. As illustrated in FIG. 9, at first, the information processor 20 senses a frequency of use of toys by a child, behavior for toys, treatment of toys, etc., using a camera, a microphone, or the like (Step S433), and performs analysis of sensor data (Step S436). Specifically, by utilizing, for example, camera images or approach of radio waves such as BLE/RFID (to be transmitted from a toy), it is possible to measure a frequency of use (a frequency of a child's play with the toy). Further, conversational speech may be collected using a microphone to extract and count spoken words concerning what toys are precious, what toys are fun to play with, what toys are favorite, or the like. As an alternative, it is also possible to measure treatment of toys (whether a child treats toys carefully or rudely) using the camera images, the conversational speech collected by a microphone, and the radio waves such as the BLE/RFID.

Next, in a case where a child's degree of attachment (including a degree of loving) to toys is high (Step S439/Yes), the information processor 20 registers such toys as precious toys (toys with a high degree of loving) (Step S442). It is possible to estimate the degree of attachment to toys as a sense of values, and to register toys with the high sense of values (this is considered also as a sense of values that represents what toys a child takes good care of).

(2-1-7. Total Sense of Values)

Next, as an example of a sense of values, a sense of values (a total sense of values) is also envisaged that represents what senses of values an individual/community regards as important. Examples of senses of values (base senses of values) that provide a basis in calculating the total sense of values include "valuing of food", "all family members' helping with housework", "tidiness (decluttering state of a room)", "childcare", "love of things" as described above, or the like. On the basis of those base senses of values, the sense of values (in other words, the "total sense of values") that represents what senses of values (candidates of the total sense of values) each member regards as important is estimated, and, for example, an average of a group is defined as the total sense of values.

FIG. 10 is a flowchart illustrating calculation processing of the total sense of values. As illustrated in FIG. 10, at first, the information processor 20 estimates base senses of values of an individual (each member of a group) (Step S453).

Next, the information processor 20 normalizes values of the individual's base senses of values (Step S456).

Thereafter, the information processor 20 refers to a related table of senses of values, and calculates a value for each of the total senses of values in accordance with weighted values of the corresponding total senses of values (Step S459). Here, an example of the related table of senses of values is represented in Table 3 given below. As indicated in Table 3 below, examples of candidates for the total sense of values include "honesty", "compassion", "society", and "individuality".

TABLE 3

| Base senses of values | Corresponding total senses of values |
| --- | --- |
| Valuing of food | Honesty: 20%, compassion: 10% |
| All family members' helping with housework | Honesty: 10%, compassion: 20%, society: 30% |
| Tidiness (in case of child's room) | Honesty: 10%, compassion: 10%, society: 40% |
| Childcare | Compassion: 50% |
| Love of things | Individuality: 30%, compassion: 10% |

Next, the information processor 20 defines the highest value (in other words, a sense of value to which the highest importance is attached) as the total sense of values (Step S462). Here, FIG. 11 illustrates an example of values for each of the total senses of values of an individual member that are calculated with reference to the weighting indicated in above Table 3. In the example illustrated in FIG. 11, a value of the sense of values "compassion" is the highest, and thus this sense of values becomes a sense of values to which the member attaches the highest importance, in other words, the "total sense of values" of the member.

2-2. Second Example

Next, description is given of visualization of senses of values of members. The system according to the present example makes it possible to value senses of values of members within a specific community. For example, the total senses of values (the senses of values to which the members attach the highest importance) may be diagrammatized to be displayed on a mobile terminal such as a smartphone of each of the members, or an electronic bulletin board (a smart TV, a web network, etc.) of a community. Here, FIG. 12 illustrates an example of a radar chart indicating the total senses of values of the members.

In an image 40 illustrated in FIG. 12, for example, the total senses of values of a plurality of members within a community are indicated using a radar chart, which allows a user to intuitively perceive what senses of values each of the members regards as important. It is to be noted that visualization of the senses of values is not limited to such a radar chart, but graphical display using a bar graph or a line chart, and the like may be utilized.

Further, in a case where any change in a sense of values takes place, when a cause for such a change is presumable, a possible cause may be indicated in conjunction with the sense of values. To date, estimation of statistical causation from observation data in multivariate random variables has been broadly divided into a method of maximizing an estimation result derived from a maximum-likelihood method or a Bayesian method each of which has information criteria or penalties as a score, and a method of performing estimation by statistical testing of conditional independence among variables. A method of representing a resulting causation among variables as a graphical model (a non-cyclic model) has been often performed because of excellence in readability of the result. An algorism of causality analysis is not limited specifically, but, for example, an causality analysis algorism CALC (registered trademark "CALC") available from Sony Computer Science Laboratories, Inc. may be used. The CALC is a technology that has been already placed into commercial use as an analysis technology of a causation in large-scale data. (https://www.isid.co.jp/news/release/2017/0530.html, https://www.isid.co.jp/solution/calc.html).

(Action Processing)

FIG. 13 is a flowchart illustrating an example of visualization processing of senses of values according to the present example. As illustrated in FIG. 13, at first, the information processor 20 carries out normalization processing for performing visualization for each of senses of values that are regarded as important within a community (Step S503). The "senses of values that are regarded as important within the community" are envisaged as the base senses of values, such as "valuing of food", "helping with housework", "tidiness of a room", "childcare", and "love of things" as described previously.

Next, the information processor 20 displays the senses of values in a chart or graphical form on a user-designated device (for example, a smartphone or the like) (Step S506).

Subsequently, in a case where estimation of a total sense of values is successful (Step S509/Yes), the information processor 20 displays also the total sense of values (Step S512).

Further, in a case where estimation of a reason for a change in a sense of values is successful (Step S515/Yes), the information processor 20 displays also the reason for a change in the sense of values (Step S518).

2-3. Third Example

In the respective examples described as above, description is given of a case where automatically estimated senses of values are visualized to give notice to members; however, the present disclosure is not limited thereto, and, for example, the information processor 20 makes it possible to give notice to the members in a case where a relationship is developed that the senses of values among the members within a community become a certain level. This allows the members to recognize any difference or consistency in the senses of values, or the like.

(2-3-1. When Difference from Criterial Sense of Values Becomes Certain Level or Above)

As an example of a case where a relationship is developed that the senses of values among the members become a certain level, for example, a case where a relationship is developed that a difference from a criterial sense of values within a specific community is at or above a certain level is envisaged. FIG. 14 is a flowchart illustrating notification processing when a relationship is developed that a difference from a criterial sense of values within a specific community according to the present example is at or above a certain level.

As illustrated in FIG. 14, at first, the information processor 20 collects sensing information on behavior for each of members within a group, and things (Step S523), and performs analysis of sensor data (Step S526).

Next, in a case where sensing of behaviors and things related to senses of values is successful (Step S529/Yes), the information processor 20 registers information concerning senses of values for target behaviors and things (Step S532).

Subsequently, the information processor 20 performs calculation of a criterial sense of values (of a group), and estimation of a sense of values of an individual (an individual sense of values) (Step S535).

Next, in a case where a difference between the criterial sense of values of the group and a sense of values of a member is at or above a certain level (in other words, in a case where a sense of values of a member deviates from the criterial sense of values) (Step S538/Yes), the information processor 20 notifies the relevant member (a user) of a difference from the criterial sense of values (Step S541). As described previously, the criterial sense of values is an average of a sense of values of each member within a community, or a sense of values of a specific member (mother, a master, or the like). Notification to a member may include screen-based notification with use of a smartphone or a tablet terminal owned by a member, a PC, a projector, a display, etc. In addition, voice-based notification utilizing, for example, an auditory AR may be used.

As described above, in the present example, by giving notification to a new member in whom senses of values different from group's senses of values have been instilled at the time of a department transfer because of, for example, a transfer within a company, or the like, it is possible to make such a member aware of a difference in the senses of values. Further, for example, as illustrated in FIG. 1, in a case where a difference at or above a certain level from a family's criterion concerning dirtiness of a room (a sense of values concerning tidiness of a room) takes place, notification indicating the family's criterion (display of the notification image 321) may be provided to a user.

(2-3-2. When Member's Sense of Values is Consistent with Criterial Sense of Values)

Next, notification at the time a criterial sense of values within a group and a member's sense of values are consistent with each other is described with reference to FIG. 15. FIG. 15 is a flowchart illustrating the notification processing when a member's sense of values is consistent with a criterial sense of values within a specific community according to the present example.

As illustrated in FIG. 15, at first, the information processor 20 collects sensing information on behavior for each of members within a group, and things (Step S553), and performs analysis of sensor data (Step S556).

Next, in a case where sensing of behaviors and things related to senses of values is successful (Step S559/Yes), the information processor 20 registers information concerning senses of values for target behaviors and things (Step S562).

Subsequently, the information processor 20 performs calculation of a criterial sense of values (of a group), and estimation of a sense of values of an individual (an individual sense of values) (Step S565).

Next, in a case where a criterial sense of values within a community and a member's sense of values are consistent with each other (Step S568/Yes), if this is a first-time consistency (Step S571/Yes), the information processor 20 notifies a user that the user's sense of values is consistent with the criterial sense of values (Step S577). Notification to a member may include screen-based notification with use of a smartphone or a tablet terminal owned by a member, a PC, a projector, a display, etc. In addition, voice-based notification utilizing, for example, an auditory AR may be used.

In contrast, although this is not a first-time consistency (Step S571/No), in a case where a certain period of time has elapsed since before the information processor 20 gave notification indicating that there is a difference from the criterial sense of values within a community, the information processor 20 notifies the user that the user's sense of values is consistent with the criterial sense of values (Step S577).

As described above, in the present example, notification is given in a case where a member's sense of values is consistent with a group's sense of values for the first time, or a certain period of time has elapsed since notification of a difference, thereby avoiding annoyance of frequent notification.

(2-3-3. When Member's Sense of Values Becomes Directly Opposite to Criterial Sense of Values)

Next, notification at the time a member's sense of values becomes directly opposite to a criterial sense of values is described with reference to FIG. 16. FIG. 16 is a flowchart illustrating the notification processing when a member's sense of values becomes directly opposite to a criterial sense of values within a specific community.

As illustrated in FIG. 16, at first, the information processor 20 collects sensing information on behavior for each of members within a group, and things (Step S583), and performs analysis of sensor data (Step S586).

Next, in a case where sensing of behaviors and things related to senses of values is successful (Step S589/Yes), the information processor 20 registers information concerning senses of values for target behaviors and things (Step S592).

Subsequently, the information processor 20 performs calculation of a criterial sense of values (of a group), and estimation of a sense of values of an individual (an individual sense of values) (Step S595).

Next, in a case where a criterial sense of values within a community and a member's sense of values has become directly opposite to each other (Step S598/Yes), the information processor 20 notifies the relevant member (a user) that the member's sense of values has become directly opposite to the criterial sense of values (Step S601). A case where the member's sense of values has become directly opposite to the criterial sense of values is envisaged as, for example, a case where a sense of values "one may leave some food." prevails in opposition to a sense of values "one must not leave any food.", a case where a sense of values "one may leave a room in a dirty state." prevails concerning "tidiness of a room", or the like. In any case, a case where a sense of values that is almost directly opposite to the criterial sense of values prevails is envisaged. It is to be noted that a term "directly opposite" is used here; however, the present example includes a case where an almost opposite sense of values prevails.

It is to be noted that notification to a member may include screen-based notification with use of a smartphone or a tablet terminal owned by a member, a PC, a projector, a display, etc. In addition, voice-based notification utilizing, for example, an auditory AR may be used.

2-4. Fourth Example

As described above, senses of values within each community become obvious, it is possible to search members of another community that meets requirements on the basis of the senses of values. Further, it is also possible to perform comparison with other communities using the senses of values of communities.

FIG. 17 is a flowchart illustrating search processing of communities/members using senses of values according to the present example.

As illustrated in FIG. 17, at first, the information processor 20 acquires a list of community candidates to be searched, or a list of member candidates who are contrasted with users on the SNS (Step S623). In other words, as an example, the information processor 20 may acquire other users linking to a searcher (a certain member of a specific community) on the SNS (Social Networking Service) in which the searcher participates, or the like as a list of member candidates.

Next, the information processor 20 accepts designation of senses of values, and entry of search conditions (Step S626). For designation of the senses of values, designation of, for example, "valuing of food", "helping with housework", "tidiness of a room (decluttering)", "childcare", or the like is envisaged. Further, for the search conditions, it is possible to enter "same (senses of values) (or similar senses of values)", "directly opposite (senses of values)", etc., as well as "communities/members (individuals) to be searched".

Subsequently, the information processor 20 searches for community candidates (Step S632) in a case of community search (Step S629/community), and searches for member candidates (Step S635) in a case of member search (Step S629/member).

Next, in a case where same senses of values are present, and conditions for displaying the same senses of values are set up (Step S638/Yes), the information processor 20 displays targets that match the same senses of values (Step S641). In other words, in a case where the searcher sets "same" as a search condition, the information processor 20 outputs communities/members having the same senses of values as those of the searcher as a search result.

In contrast, in a case where directly opposite senses of values are present, and conditions for displaying the directly opposite senses of values are set up (Step S644/Yes), the information processor 20 displays targets that match the directly opposite senses of values (Step S647). In other words, in a case where the searcher sets "directly opposite" as a search condition, the information processor 20 outputs communities/members having the senses of values that are directly opposite to those of the searcher as a search result.

As described above, the present example allows a user to search for persons or other communities having the same (or similar) senses of values as (to) those of the user, or to search for persons or other communities having the opposite senses of values.

It is to be noted that, in the above-described action processing, it is envisaged to execute a search function using a search screen; however, the use of a sense of values filter is considered as an application of the search function. For example, setting of the sense of values filter on a social network, or the like makes it possible to filter the words only of persons having the same sense of values (or persons having the directly opposite sense of values) among users linking on the social network, for example. As an alternative, in person-to-person linkage on the social network, in a case where a user links to another user having the same sense of values once more, or a user's sense of values is consistent with that of another user who has already established linkage because of a change in the sense of values of such a user, it is also possible to give such a user notification indicating that "one person having the same sense of values has appeared", or the like.

3. Conclusion

As described above, the information processing system according to the embodiment of the present disclosure makes it possible to automatically estimate a sense of values within a specific community.

As above, description has been given in detail of the preferred embodiment of the present disclosure with reference to the accompanying drawings. However, the present technology is not limited to such examples. It is obviously possible that a person having ordinary skill in the art of the present disclosure conceive various kinds of alterations or modifications in a category of a technological idea described in the claims. It is to be understood that these alterations or modifications also naturally belong to the technological scope of the present disclosure.

For example, it is possible to create a computer program that causes hardware to exhibit capabilities of the information processor 20. The hardware includes the CPU, the ROM, and the RAM, or the like, that are built in the above-described information processor 20. In addition, a computer readable storage medium having the computer program stored therein is also provided.

In addition, the effects described herein are merely illustrative or exemplary, and not limiting. That is, a technique according to the present disclosure may have other effects that are apparent to those skilled in the art from the description herein, together with the above-described effects or in place of the above-described effects.

It is to be noted that it is possible for the present technology to take configurations as described below.

(1)

An information processor including
   a control unit that performs a control, the control unit being configured to acquire sensor data obtained by sensing a member who belongs to a specific community, and
automatically estimate a sense of values of the member who belongs to the specific community, on a basis of the acquired sensor data.

(2)

The information processor according (1), in which the control unit
analyzes specific sensor data to estimate a predetermined sense of values, and
automatically estimates the predetermined sense of values, in accordance with a result of the analysis.

(3)

The information processor according to (1) or (2), in which the control unit
automatically estimates a total sense of values indicating which sense of values out of a plurality of senses of values is considered to be important as the sense of values of the member who belongs to the specific community, on the basis of the acquired sensor data.

(4)

The information processor according to any one of (1) to (3), in which the control unit is configured to generate a graph that represents senses of values of members, on a basis of the member belonging to the specific community.

(5)

The information processor according to any one of (1) to (4), in which the control unit performs the control to cause a specific member to be notified when a relationship between senses of values of members belonging to the specific community is in a certain situation.

(6)

The information processor according to (5), in which the control unit performs notification to a specific member having a sense of values that is, to a certain degree or more, different from a criterial sense of values generated on the basis of the sense of values of the member who belongs to the specific community.

(7)

The information processor according to (5), in which the control unit performs notification to a specific member having a sense of values that is substantially consistent with a criterial sense of values generated on the basis of the sense of values of the member who belongs to the specific community.

(8)

The information processor according to (5), in which the control unit performs notification to a specific member having a sense of values that is directly opposite to a criterial sense of values generated on the basis of the sense of values of the member who belongs to the specific community.

(9)

The information processor according to any one of (6) to (8), in which the control unit performs the notification including presentation of the criterial sense of values to the specific member.

(10)

The information processor according to any one of (1) to (9), in which the control unit is configured to search a member who belongs to another community that is different from the specific community, on the basis of the sense of values.

(11)

The information processor according to (10), in which the control unit is configured to search a member having a similar sense of values to a sense of values of a specific member who belongs to the specific community, from members who are registered with social media in which the specific member participates, and to notify the specific member.

(12)

An information processing method including:
acquiring, with a processor, sensor data obtained by sensing a member who belongs to a specific community; and
automatically estimating, with the processor, a sense of values of the member who belongs to the specific community, on a basis of the acquired sensor data.

(13)

A recording medium containing a program recorded therein that causes a computer to function as a control unit that performs a control, the control including:
acquiring sensor data obtained by sensing a member who belongs to a specific community; and
automatically estimating a sense of values of the member who belongs to the specific community, on a basis of the acquired sensor data.

REFERENCE NUMERAL LIST

10 System
20 Information processor
30 Sensor
32 Output device
200 Control unit
201 User management section
202 Sense of values estimation section
203 Sense of values comparison section
204 Presentation section
210 Communication unit
220 Storage unit
321 Notification image

The invention claimed is:

1. An information processor, comprising:
circuitry configured to:
   acquire sensor data obtained by sensing a first member of a plurality of members, wherein
      the plurality of members is associated with a first community, and
      the acquired sensor data includes first information of a plurality of types of events associated with the first member;
   determine a number of instances of a type of event of the plurality of types of events in the acquired sensor data;
   estimate a sense of values of the first member for the type of event based on the determined number of instances of the type of event in the acquired sensor data;
   determine a criterial sense of values of the first community for the type of event based on a sense of values of each member of the plurality of members;
   control, based on a deviation of the estimated sense of values of the first member from the criterial sense of values of the first community, an output device corresponding to the first member to notify second information to the first member, wherein the second information indicates the criterial sense of values of the first community; and
   search a second member of a second community different from the first community on a social network, wherein the search is based on a sense of values of the second member that is same as the estimated sense of values of the first member; and link the first member with the second member of the second community on the social network.

2. The information processor according to claim 1, wherein the circuitry is further configured to estimate, as a total sense of values, a sense of values of a plurality of senses of values with a highest degree of importance among the plurality of senses of values.

3. The information processor according to claim 1, wherein the circuitry is further configured to generate a graph that represents a plurality of senses of values of the plurality of members belonging to the first community.

4. The information processor according to claim 1, wherein the second information is notified to the first member based on the deviation of the estimated sense of values that is greater than or equal to a threshold value.

5. The information processor according to claim 1, wherein the second information is notified to the first member based on the deviation of the estimated sense of values that is less than a threshold value.

6. The information processor according to claim 1, wherein the circuitry is further configured to notify the first member regarding the second member.

7. An information processing method, comprising:
acquiring sensor data obtained by sensing a first member of a plurality of members, wherein
the plurality of members is associated with a first community, and
the acquired sensor data includes first information of a plurality of types of events associated with the first member;
determining a number of instances of a type of event of the plurality of types of events in the acquired sensor data;
estimating a sense of values of the first member for the type of event based on the determined number of instances of the type of event in the acquired sensor data;
determining a criterial sense of values of the first community for the type of event based on a sense of values of each member of the plurality of members;
controlling, based on a deviation of the estimated sense of values of the first member from the criterial sense of values of the first community, an output device corresponding to the first member to notify second information to the first member, wherein the second information indicates the criterial sense of values of the first community; and
searching a second member of a second community different from the first community on a social network, wherein the search is based on a sense of values of the second member that is same as the estimated sense of values of the first member; and
linking the first member with the second member of the second community on the social network.

8. A non-transitory computer-readable medium having stored thereon, computer-executable instructions which, when executed by a computer, cause the computer to execute operations, the operations comprising:
acquiring sensor data obtained by sensing a first member of a plurality of members, wherein
the plurality of members is associated with a first community, and
the acquired sensor data includes first information of a plurality of types of events associated with the first member;
determining a number of instances of a type of event of the plurality of types of events in the acquired sensor data;
estimating a sense of values of the first member for the type of event based on the determined number of instances of the type of event in the acquired sensor data;
determining a criterial sense of values of the first community for the type of event based on a sense of values of each member of the plurality of members;
controlling, based on a deviation of the estimated sense of values of the first member from the criterial sense of values of the first community, an output device corresponding to the first member to notify second information to the first member, wherein the second information indicates the criterial sense of values of the first community; and
searching a second member of a second community different from the first community on a social network, wherein the search is based on a sense of values of the second member that is same as the estimated sense of values of the first member; and
linking the first member with the second member of the second community on the social network.

* * * * *